US007986656B2

(12) United States Patent
Li et al.

(10) Patent No.: US 7,986,656 B2
(45) Date of Patent: Jul. 26, 2011

(54) METHOD AND SYSTEM FOR INTER-NETWORK MOBILE NUMBER PORTABILITY

(75) Inventors: Yubin Li, Shenzhen (CN); Peng Yu Dong, Shenzhen (CN); Xi Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 494 days.

(21) Appl. No.: 11/623,886

(22) Filed: Jan. 17, 2007

(65) Prior Publication Data
US 2008/0171544 A1    Jul. 17, 2008

(51) Int. Cl.
*H04W 4/00* (2009.01)
(52) U.S. Cl. ............... 370/328; 370/331; 455/432.1
(58) Field of Classification Search ........ 370/331–334, 370/328; 455/432.1–3, 433, 435.1, 436–9; 379/221.1
See application file for complete search history.

(56) References Cited

U.S. PATENT DOCUMENTS

| 5,862,481 | A  | * | 1/1999 | Kulkarni et al. | 455/432.2 |
| 6,799,017 | B1 | * | 9/2004 | Kregel | 455/70 |
| 7,272,393 | B1 | * | 9/2007 | Wuthnow et al. | 455/432.1 |
| 7,379,449 | B2 | * | 5/2008 | Michalski et al. | 370/352 |
| 2007/0155382 | A1 | * | 7/2007 | Jiang | 455/433 |
| 2007/0191011 | A1 | * | 8/2007 | Jiang | 455/436 |

* cited by examiner

*Primary Examiner* — Derrick Ferris
*Assistant Examiner* — Peter Cheng

(57) ABSTRACT

A method for inter-network communication between a first and second user. The method includes receiving a first request for a location associated with the second user from a first switching system for a first network in response to a second request. The method processes information associated with the first request and determines a network identifier for a second network related to the location associated with the second user, and sends the first switching system a location message, including the network identifier for the second network. The method includes receiving a third request for routing information associated with the second user from a second switching system for the second network. The method determines a location directory in the second network for the second user and receives the roaming information for the second user from the location directory. The method then sends the roaming information to the second switching system.

28 Claims, 12 Drawing Sheets

METHOD AND SYSTEM FOR INTER-NETWORK MOBILE NUMBER PORTABILITY

BACKGROUND OF THE INVENTION

The present invention is directed to inter-network communication. More particularly, the invention provides a method and system for Mobile Number Portability (MNP) for inter-network communication. Merely by way of example, the invention has been applied to a signaling transfer point (STP) system capable of handling calling and non-calling types of mobile communication between two networks. According to embodiments of the invention, a calling type communication can include voice, video, and multi-media communication, and a non-calling type communication can include text, data, and short message communication. But it would be recognized that the invention has a much broader range of applicability. For example, the invention can be applied to inter-network communication among multiple networks.

Mobile Number Portability (MNP) technology is one of fundamental requirements for network development. In particular, the implementation of MNP over the calling network has already become a mainstream practice in the industry. For example, ETSI 0366 standardizes the MNP process within G network (GSM network) and between G networks, including calling type and non-calling type processes. Moreover, Number Portability (NP) in C network (CDMA network) also has related specifications. However, there has not been an NP process that is capable of handling the non-calling type communication. Furthermore, none of the above specifications have been able to resolve MNP between different networks, for example, between a CDMA network (C network) and a GSM network (G network).

FIG. 1 is a diagram of a conventional method for inter-network communication. As shown, a conventional technique for performing NP between CDMA network and GSM network utilizes a Transit Mobile Switching Center (TMSC) 101. After TMSC receives a call, it first requests C network Home Location Register (HLR) 112 for an address. If the called user NP has reached the GSM network, then C network HLR will be unable to find the user information, and it will send an ERROR. After receiving the ERROR message, TMSC contacts G network HLR 122 for addressing based on the configuration, and finally establishes the call.

FIG. 2 is a diagram of another conventional method for inter-network communication. As shown, the method adopts a Signal Transfer Point (STP) to carry out protocol conversion to achieve MNP between CDMA and GSM networks. An example of an STP may be an SG7000 system from Huawei Technologies, Ltd. After STP intercepts Loc_reg messages, it queries an NPDB database (Number Portability Database, not shown). If it is found that the called user NP reached the GSM network, then after STP receives Sri_ack returned by HLR, it converts the message as a Loc_reg ack message and sends it back to the calling VMSC. The calling VMSC then initiates the call again based on the roaming number included in the Loc_req message. These conventional methods have many limitations as discussed below.

BRIEF SUMMARY OF THE INVENTION

The present invention is directed to inter-network communication. More particularly, the invention provides a method and system for Mobile Number Portability (MNP) for inter-network communication. Merely by way of example, the invention has been applied to a signaling transfer point (STP) system capable of handling calling and non-calling types of mobile communication between two networks. According to embodiments of the invention, a calling type communication can include voice, video, and multi-media communication, and a non-calling type communication can include text, data, and short message communication. But it would be recognized that the invention has a much broader range of applicability. For example, the invention can be applied to inter-network communication among multiple networks.

According to an embodiment of the present invention, a method is provided for inter-network communication between a first user and a second user. The method includes receiving a first request for a location associated with the second user. In an embodiment, the first request is sent by a first switching system for a first network in response to a second request, which is made by the first user to establish a communication with the second user. The method includes processing information associated with the first request. In an embodiment, the processing of information includes querying a database. For example, the database can be a number portability database (NPDB) for the first network. In another example, the processing of information includes querying a common database for the first network and the second networks. In a specific embodiment, the database is a shared STP-NPDB for the first network and the second network. The method includes determining a network identifier for a second network related to the location associated with the second user based on at least information associated with the first request. The method then sends a location message to the first switching system. In a specific embodiment, the location message includes the network identifier for the second network. The method also includes receiving a third request for routing information associated with the second user in the second network. In an embodiment, the third request is sent from a second switching system for the second network. The method further includes determining a location directory in the second network for the second user. In an embodiment the location directory is capable of determining roaming information for the second user in the second network. The method receives the roaming information for the second user from the location directory and sends the roaming information to the second switching system. In an embodiment, the second switching system is capable of establishing the communication with the second user.

According to an alternative embodiment of the invention, a method is provided for inter-network communication between a first user and a second user. The method includes receiving a first request for a location associated with the second user. In an embodiment the request is sent by a switching system for a first network in response to a second request, which is made for the first user to establish a communication with the second user. The method processes information associated with the first request and determines number portability (NP) attribute information associated with the second user. In a specific embodiment, NP attribute information includes a user's home network and current network association. For example, if the NP attribute information is determined to indicate that a home network for the second user is the first network and the second user is currently in a second network, then the method determines a network identifier for the second network related to the location associated with the second user based on information associated with the first request and sends a location message to the switching system. The location message includes at least the network identifier for the second network. In another example, if the NP attribute information is determined to indicate that a home network for the second user is the second network and the second user is currently in the first network, then the method determines a location directory in the first network for the second user. In an embodiment, the location directory is capable of determining roaming information for the second user. The method then receives the roaming information for the second user from the location directory and sends the roaming information to the switching system. In an embodiment the switching system is capable of establishing the communication with the second user.

In another embodiment of the invention, a system is provides for inter-network communication between a first user and a second user. In an embodiment, the system includes one or more components which are configured to receive a first request for a location associated with the second user. In a specific embodiment, the first request is sent by a first switching system in a first network in response to a second request, which is made by the first user to establish a communication with the second user. The system includes one or more components to process information associated with the first request and determines a network identifier for a second network related to the location associated with the second user based on at least information associated with the first request. The system also includes one or more components to send a location message to the first switching system. In an example, the location message includes the network identifier for the second network. In an embodiment, the system includes one or more components which are configured to receive a third request for routing information associated with the second user in the second network. For example, the third request is sent from a second switching system for the second network. The system includes one or more components to determine a location directory in the second network for the second user. In an embodiment, the location directory is capable of determining roaming information for the second user in the second network. The system also includes one or more components configured to receive the roaming information for the second user from the location directory, and to send the roaming information to the second switching system. In a specific embodiment, the second switching system is capable of establishing the communication with the second user.

In another alternative embodiment, the invention provides a system for inter-network communication between a first user and a second user. The system includes one or more components configured to receive a first request for a location associated with the second user. In an embodiment, the request is sent by a switching system for a first network in response to a second request, which is made for the first user to establish a communication with the second user. The system includes one or more components configured to process information associated with the first request, and to determine NP attribute information associated with the second user. The system includes one or more components configured to determine, based on the NP attribute information, if a home network for the second user is the first network and the second user is currently in a second network. The system also includes one or more components configured to determine a network identifier for the second network related to the location associated with the second user based on at least information associated with the first request and to send a location message to the switching system, the location message including the network identifier for the second network. The system includes one or more components configured to determine, based on the NP attribute information, if a home network for the second user is the second network and the second user is currently in the first network. The system also includes one or more components configured to determine a location directory in the first network for the second user. In an embodiment, the location directory is capable of determining roaming information for the second user. The system further includes one or more components configured to receive the roaming information for the second user from the location directory and send the roaming information to the switching system, which is capable of establishing the communication with the second user.

Many benefits are achieved by way of the present invention over conventional techniques. For example, the present technique provides techniques for improved inter-network communication between different networks. In some embodiments, the method provides a common STP-NPDB for two networks, e.g. CDMA and GSM networks of one service provider. From the service provider's viewpoint, it can save investment and maintenance costs. According to embodiments of the invention, methods are provided for improving network structure. In other embodiments, the invention provides techniques for resolving MNP for the calling type and non-calling type. In other embodiments, STP-NPDB may concurrently act as the signaling switching point STP. In an embodiment, the invention provides methods capable of concurrently resolving MNP between one service provider's CDMA network and other network type used by other service providers, including the calling type and non-calling type resolution proposal. In another embodiment, when inter-network call is made to an NP user, the called intelligence services of the NP user in the new home network contract will be preserved. In a particular embodiment, the invention provides a method capable of resolving FNR in a CDMA network. Additionally, the method provides a technique that is compatible with conventional technology without substantial modifications to conventional equipment and processes. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is directed to inter-network communication. More particularly, the invention provides a method and system for Mobile Number Portability (MNP) for inter-network communication. Merely by way of example, the invention has been applied to a signaling transfer point (STP) system capable of handling calling and non-calling types of mobile communication between two networks. According to embodiments of the invention, a calling type communication can include voice, video, and multi-media communication, and a non-calling type communication can include text, data, and short message communication. But it would be recognized that the invention has a much broader range of applicability. For example, the invention can be applied to inter-network communication among multiple networks.

Figure 1:
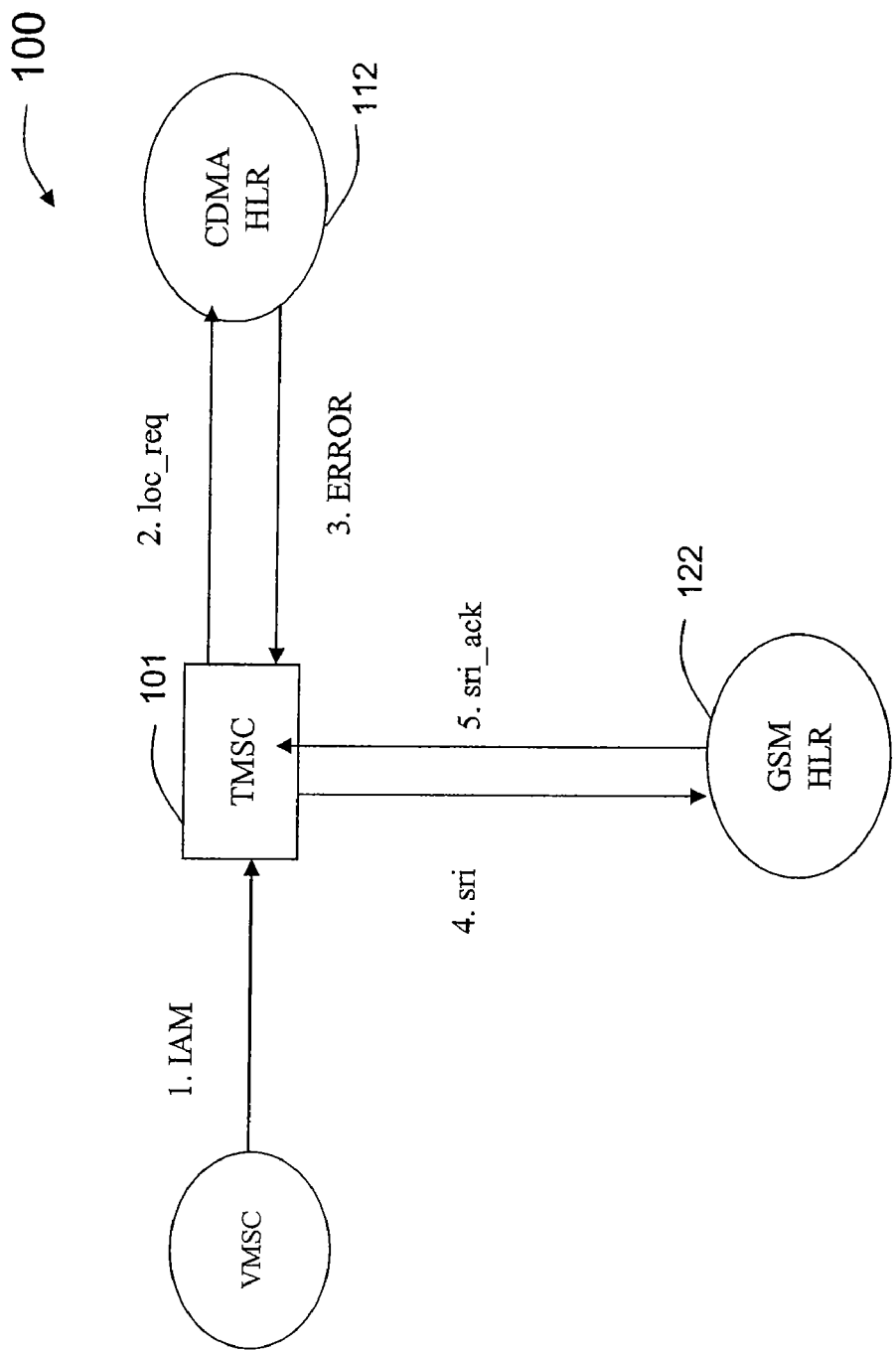
FIG. 1 is a diagram of a conventional method for inter-network communication.

As discussed above with reference to FIG. 1, a conventional method for inter-network communication includes deployment of TMSC to achieve NP between C network and G network. This technique has many drawbacks. For example, these drawbacks include the following:

1. It requires that the calls be joined at TMSC, and a certain degree of detour exists over the telephone channel;
2. It is unable to resolve non-calling related NP processes, for example, the short message process;
3. The cost is high; and
4. Because the networks between the service providers are intercommunicating through a gateway, MSC of one service provider is unable to visit the HLR of another service provider. Therefore, it is impossible to apply to the MNP between service providers.

Figure 2:
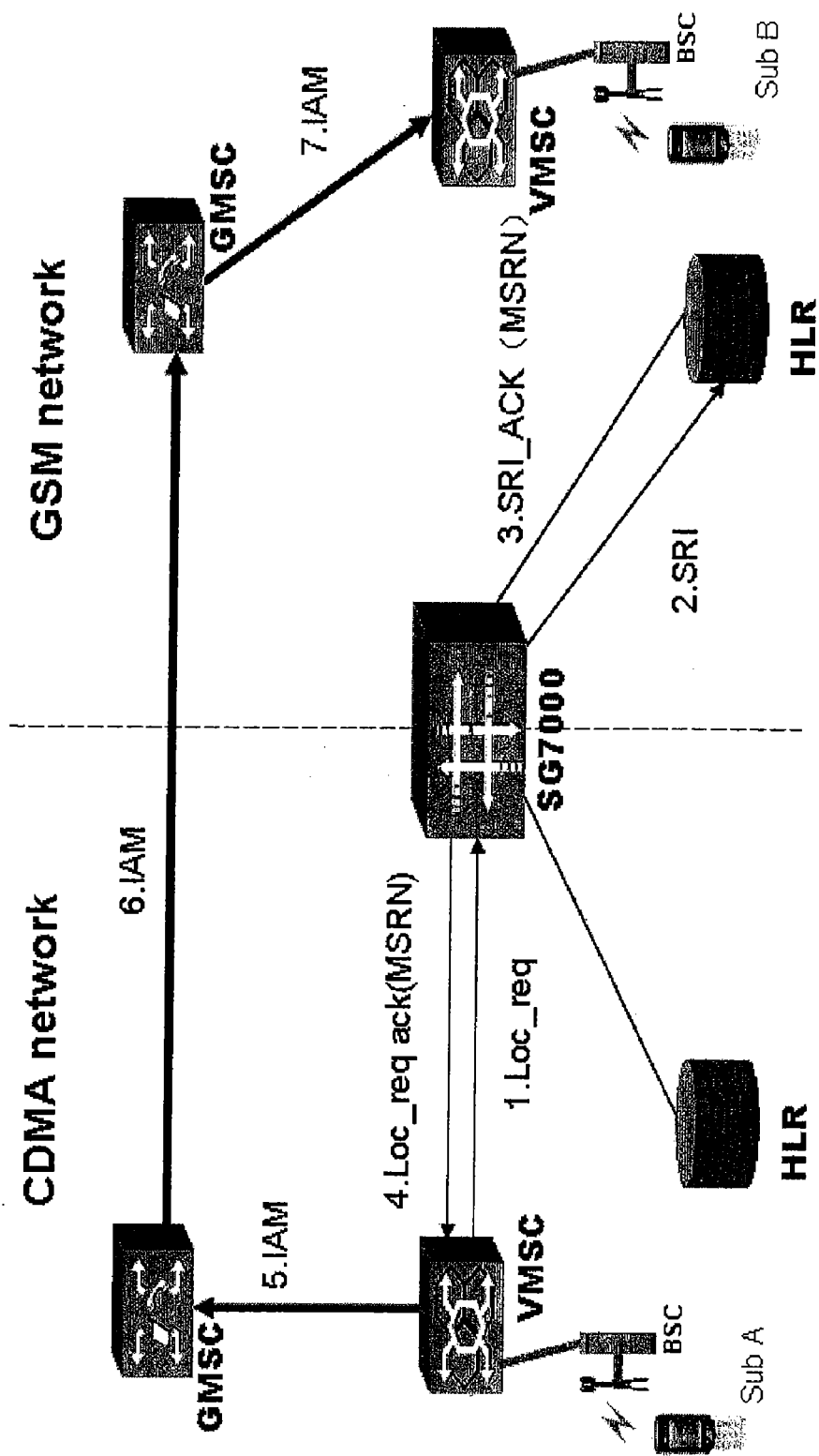
FIG. 2 is a diagram of another conventional method for inter-network communication.

As discussed above with reference to FIG. 2, a second conventional method adopts Signal Transfer Point (STP) to carry out protocol conversion to achieve MNP between CDMA and GSM networks. This technique also has many drawbacks. For example, these drawbacks include the following:

1. Since the networks between the service providers are intercommunicating through the gateway, the protocol conversion method may not solve MNP problems concerning CDMA and GSM networks between the service providers;
2. This method is only applicable to the internal MNP under the circumstances that a service provider has two networks (C network and G network), and therefore lacks versatility; and
3. When generating inter-network calls, some of the contracted service business of the called user will be lost.

These and other drawbacks and limitations are described throughout the present specification and more particularly below. From the above, it is seen that an improved technique for inter-network communication is desired.

According to embodiments of the present invention, improved techniques are provided for inter-network communication. For example, in certain embodiments, methods and systems for Mobile Number Portability (MNP) in inter-network communication are provided. Depending upon the embodiment, the present invention includes various features, which may be used. These features include the following:

1. CDMA network and GSM network may coexist in a service provider internally, and a user may carry out NP between two networks;
2. When CDMA network and GSM network coexists within a service provider, one NPDB may be shared as the NPDB for C network and G network;
3. A MNP method is provided for the calling type and non-calling type between CDMA networks and other networks between service providers;
4. A Flexible Number Routing (FNR) resolution method within CDMA networks is provided;
5. The aforementioned functionalities of the embodiments of the present invention do not require re-modification of other network elements; and
6. When inter-network calling occurs, all services of the called that the NP user has signed the contract in the new network may be activated correctly, and there is no telephone channel detour problem.

As shown, the above features may be in one or more of the embodiments to follow. These features are merely examples, which should not unduly limit the scope of the claims herein. One of ordinary skill in the art would recognize many variations, modifications, and alternatives.

Figure 3:
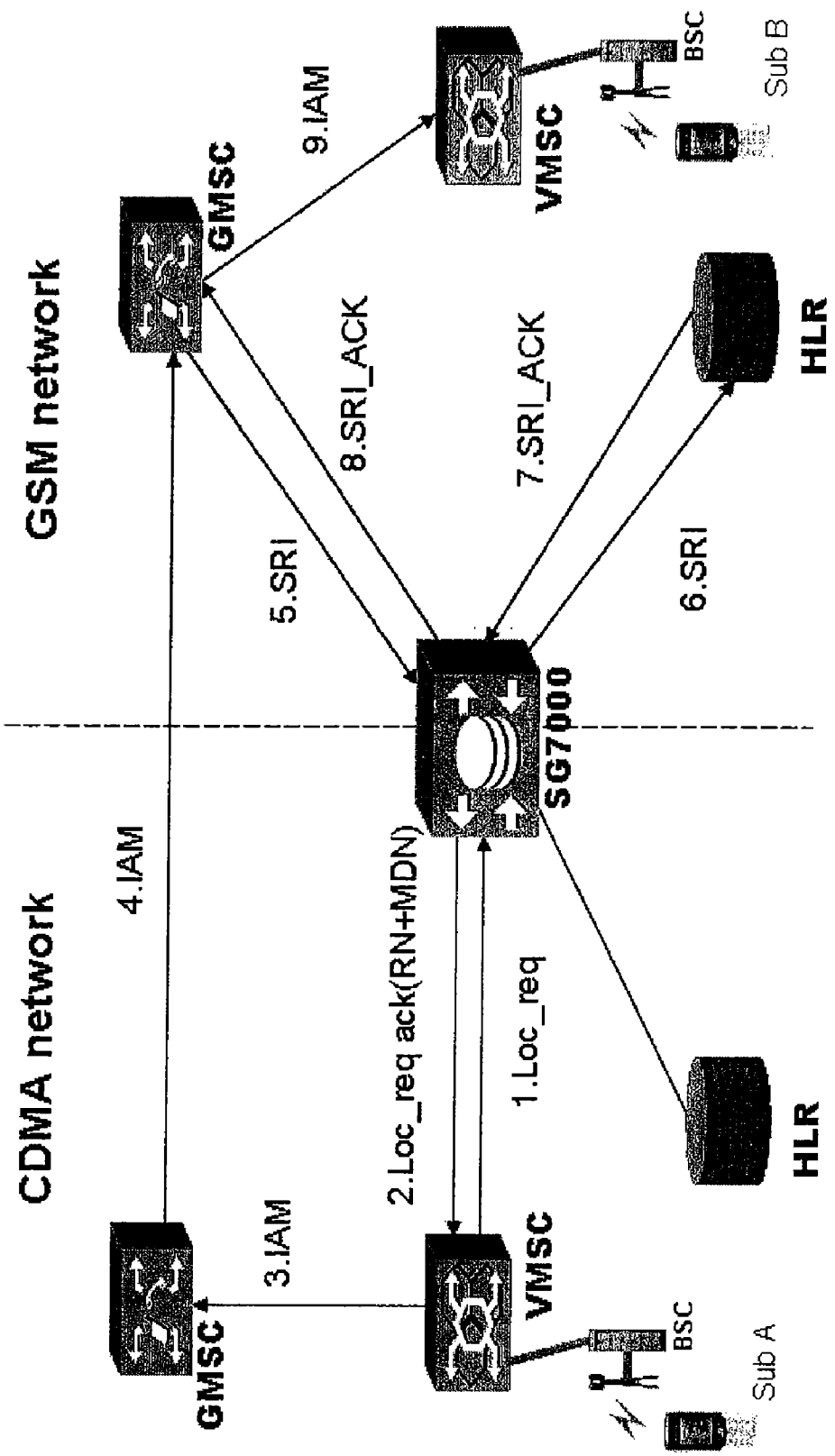
FIG. 3 is a simplified diagram of an inter-network communication method for calling type communication from a CDMA network to a GSM network according to an embodiment of the present invention.

FIG. 3 is a simplified diagram of an inter-network communication method for calling type communication from a CDMA network to a GSM network according to an embodiment of the present invention. This diagram is merely an example, which should not unduly limit the scope of the claims herein. One of ordinary skill in the art would recognize other variations, modifications, and alternatives. As shown, the method includes a calling process by a CDMA user calling from CDMA network NP to a user in GSM network. According to embodiments of the invention, a calling type communication can include voice, video, and multi-media communication. In a specific embodiment, the method includes an STP returning a routing number (RN) between CDMA and GSM networks. With reference to FIG. 3, the method includes the following processes:

1. C network VMSC initiates Location$_{request}$;
2. STP (e.g. a Huawei SG7000 system) intercepts this message, detects that the called user has already NP to G network, simulates C network HLR and returns Loc_req ack message to C network VMSC, which includes RN AND MDN, where RN is a routing number directed to GSM network and MDN is a mobile directory number;
3. C network VMSC initiates IAM (initial access message) to C network GMSC after receiving it;

4. C network GMSC initiates IAM of G network GMSC after receiving it;

5. G network GMSC initiates an SRI request to the G network HLR;

6. STP intercepts the SRI message, confirms the called is a NP-IN user according to NP data, then STP forwards SRI message to the correct HLR;

7. HLR returns the roaming number of the called;

8. STP forwards the SRI_ACK message that was returned by HLR to G network GMSC; and 9. GMSC initiates calling to VMSC where the called is located.

Figure 4:
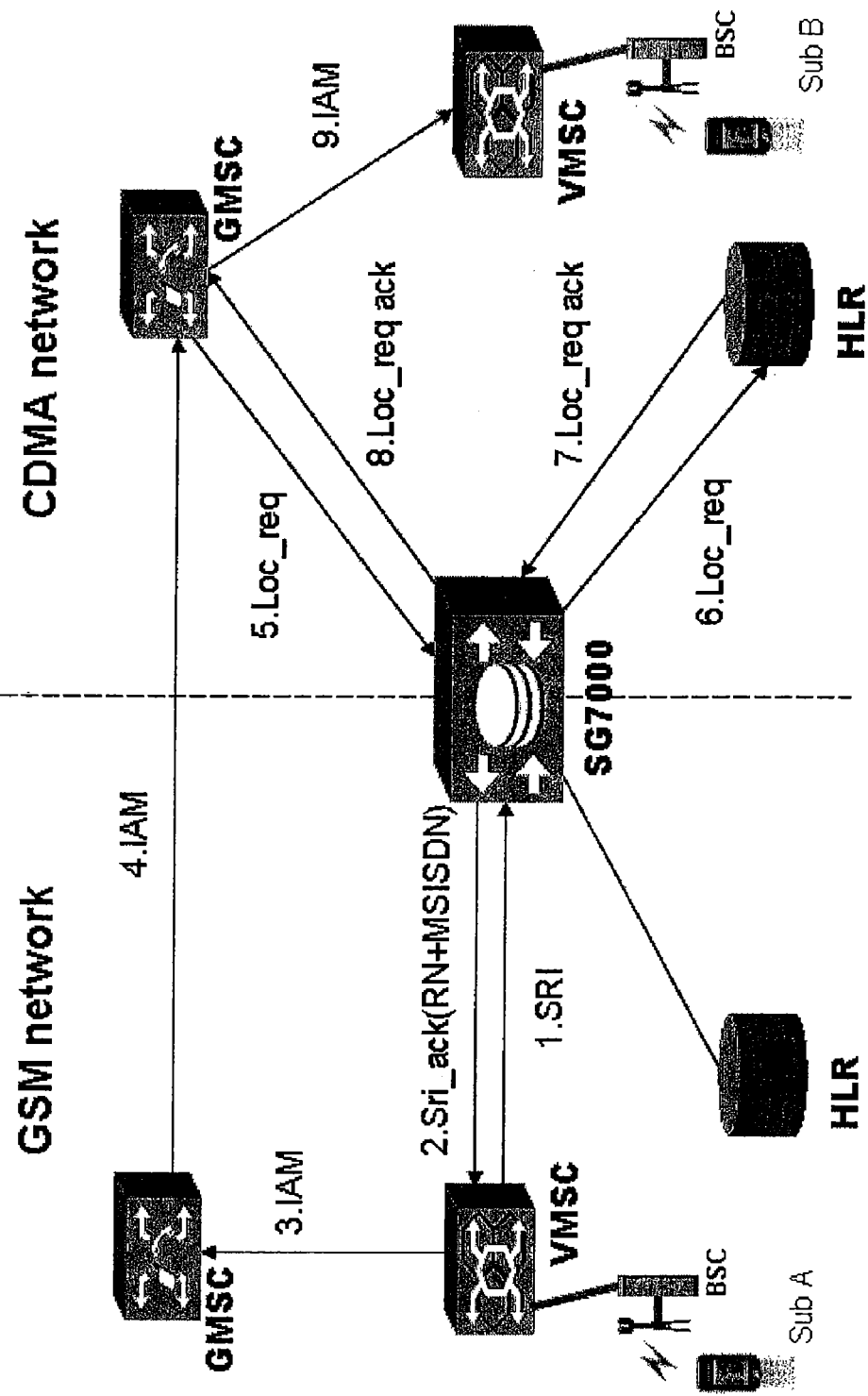
FIG. 4 is a simplified diagram of an inter-network communication method for calling type communication from a GSM network to a CDMA network according to an embodiment of the present invention.

FIG. 4 is a simplified diagram of an inter-network communication method for calling type communication from a GSM network to a CDMA network according to an embodiment of the present invention. This diagram is merely an example, which should not unduly limit the scope of the claims herein. One of ordinary skill in the art would recognize other variations, modifications, and alternatives. As shown, the method includes a calling process of GSM user calling from GSM network NP to a user of CDMA network. In a specific embodiment, the method includes an STP returning a routing number (RN) between CDMA and GSM networks. With reference to FIG. 4, the method includes the following processes:

1. Because NP is generated between C/G networks, G network calling VMSC is unable to determine the user's home based on the MSISDN mobile area code of the called, therefore, the calling VMSC initiates SRI operation;

2. STM intercepts this message, detects the called is a user NP from the current network to C network, then it simulates G network HLR and loops back Sri_ack message to G network calling VMSC. The message includes the RN and MSISDN information for the called user, where RN is directed to the CDMA network;

3. The calling VMSC initiates calling to GMSC based on RN;

4. G network GMSC initiates calling of C network GMSC;

5. C network GMSC initiates Loc_req request to C network HLR;

6. STP intercepts Loc_req message, confirms the called is a user from G network to the current network, then STP forwards Loc_req message to the home HLR;

7. HLR returns the roaming number of the called;

8. STP forwards Loc_req ack message returned by HLR to GMSC of C network; and

9. G network GMSC initiates calling in VMSC where the called is located.

According to certain embodiments of the present invention, techniques are provided for handling non-calling type communication between networks. According to embodiments of the invention, a non-calling type communication can include text, data, and short message communication. In a specific embodiment, a method is provided for Mobile Number Portability (MNP) in non-calling type communication between CDMA and GSM networks through returning information included in an ERROR message. Further detail is discussed in the examples below.

Figure 5:
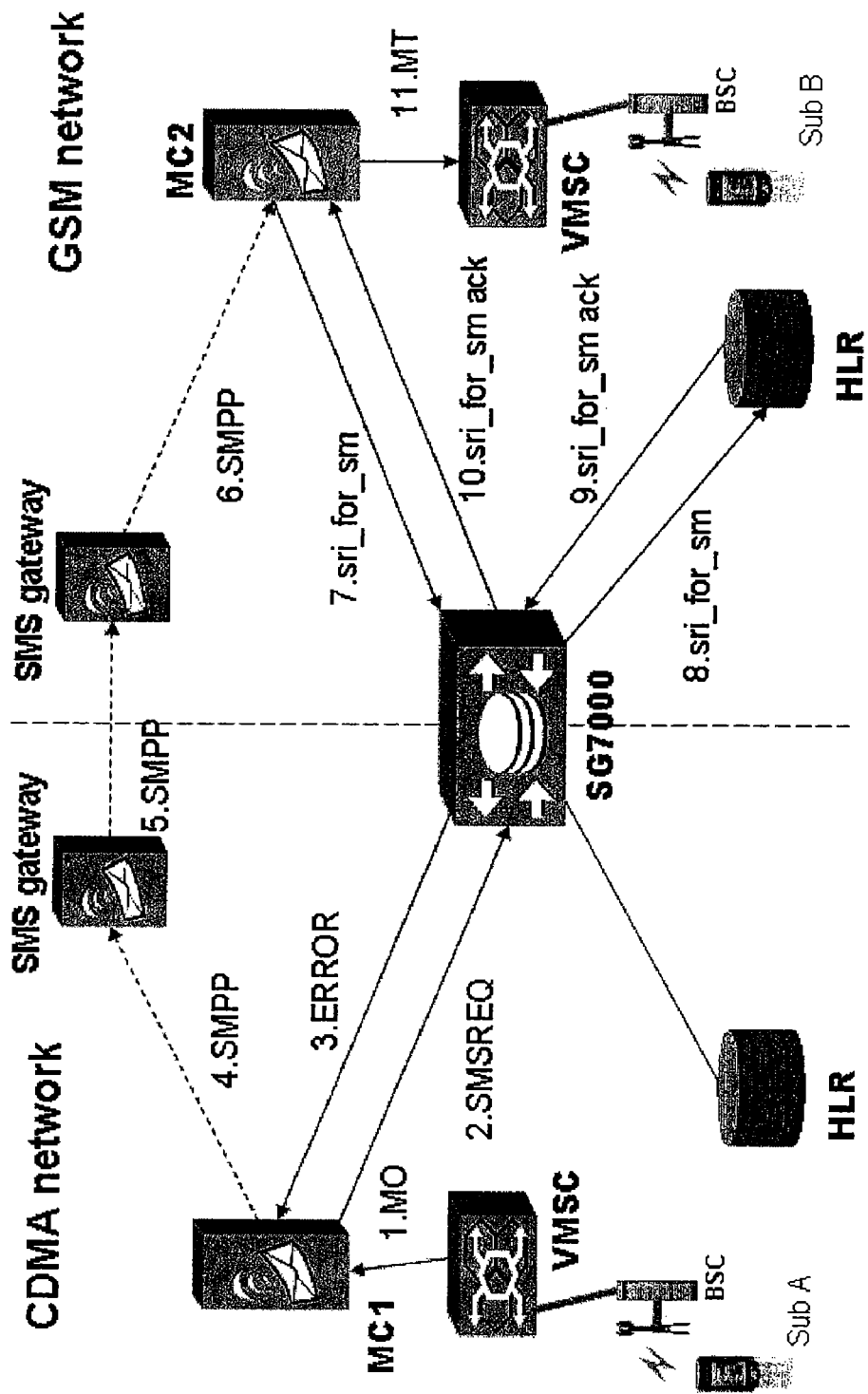
FIG. 5 is a simplified diagram of an inter-network communication method for non-calling type communication using an error short message from a CDMA network to a GSM network according to an embodiment of the present invention.

FIG. 5 is a simplified diagram of an inter-network communication method for non-calling type communication using an error short message from a CDMA network to a GSM network according to an embodiment of the present invention. This diagram is merely an example, which should not unduly limit the scope of the claims herein. One of ordinary skill in the art would recognize other variations, modifications, and alternatives. As shown, the method includes a process of a CDMA user sending a short message from CDMA network NP to a user in GSM network. In a specific embodiment, the method includes STP-NPDB returning an ERROR message on the CDMA network side. With reference to FIG. 5, the method includes the following processes:

1. The CDMA user A sends a short message from a CDMA network NP to user B of a GSM network. VMSC sends an MO (mobile originated) message to the calling user home short message center;

2. The calling home short message center MC1 initiates SMSREQ for the routing operation;

3. After STP-NPDB intercepts the SMSREQ message, detects that the called is a user NP to a GSM network, it then simulates HLR and returns an error message to MC1, which includes SMSACCDEN parameter. In a specific embodiment, a specific parameter can be selected from reserved values, and the range is between 224-255;

4. After the short message center MC1 receives the error message returned by STP-NPDB, it sends the short message to a short message gateway through SMPP protocol;

5. The CDMA network short message gateway sends the short message to the short message gateway of the GSM network;

6. The GSM network short message gateway sends the short message to the home short message gateway MC2 of the called;

7. After MC2 gets the routing information from HLR, it issues the short message to VMSC where the called is located through MT.

Figure 6:
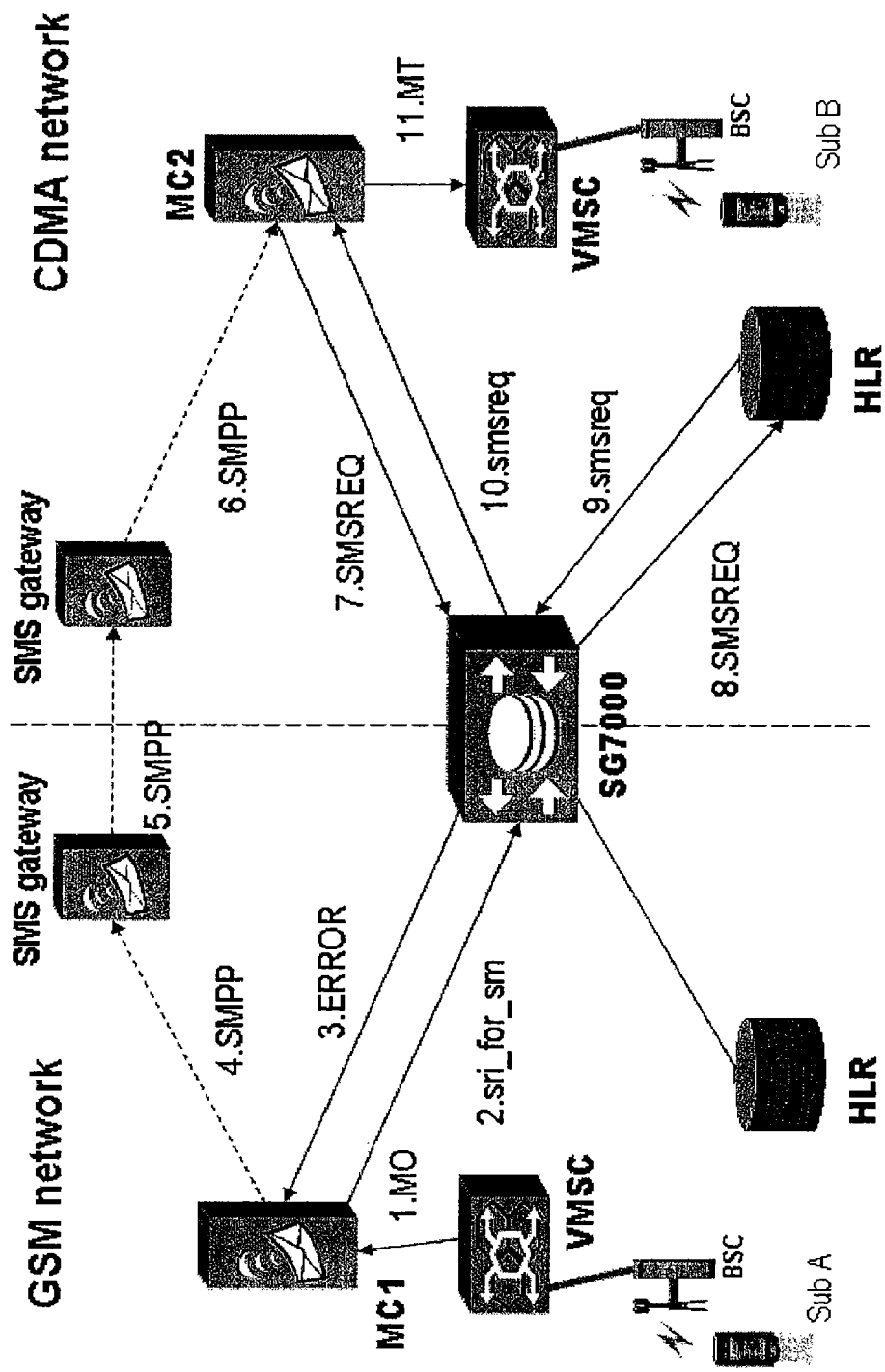
FIG. 6 is a simplified diagram of an inter-network communication method for non-calling type communication using an error short message from a GSM network to a CDMA network according to an embodiment of the present invention.

FIG. 6 is a simplified diagram of an inter-network communication method for non-calling type communication using an error short message from a GSM network to a CDMA network according to an embodiment of the present invention. This diagram is merely an example, which should not unduly limit the scope of the claims herein. One of ordinary skill in the art would recognize other variations, modifications, and alternatives. As shown, the method includes a process of a GSM user sending a short message from GSM network NP to a user in CDMA network. In a specific embodiment, the method includes STP-NPDB returning an ERROR message on the GSM network side. When a GSM user sends a short message to NP to a user of a CDMA network, after STP-NPDB intercepts the Sri_for_SM message, it simulates HLR and returns an error, where the ERROR-CODE is recommended as "Unavailablesubscriber" in a specific embodiment. The error cause may be represented in an extended enumeration value. With reference to FIG. 6, the method includes the following processes:

1. A GSM user A sends a short message to GSM network NP to user B of a CDMA network. VMSC sends MO (mobile originated) message to the called home short message center;

2. The called home short message center MC1 sends SendRoutingInfoForSM for routing operation;

3. After STP-NPDB intercepts Sri_for_SM message, it detects the called is a user NP to CDMA network, then simulates HLR and returns an ERROR MESSAGE to MC1, where the ERROR-CODE is recommended as "Unavailablesubscriber" in a specific embodiment; the error cause may be represented by an extended enumeration value;

4. After the short message center MC1 receives the error message returned by STP-NPDB, then it sends the short message to the short message gateway through SMPP protocol;

5. The GSM network short message gateway sends the short message to the CDMA network short message gateway;

6. The CDMA network gateway sends the short message to the called home short message gateway MC2.

7. After MC2 gets the routing message, it issues the short message to VMSC where the called is located through MT.

Figure 7:
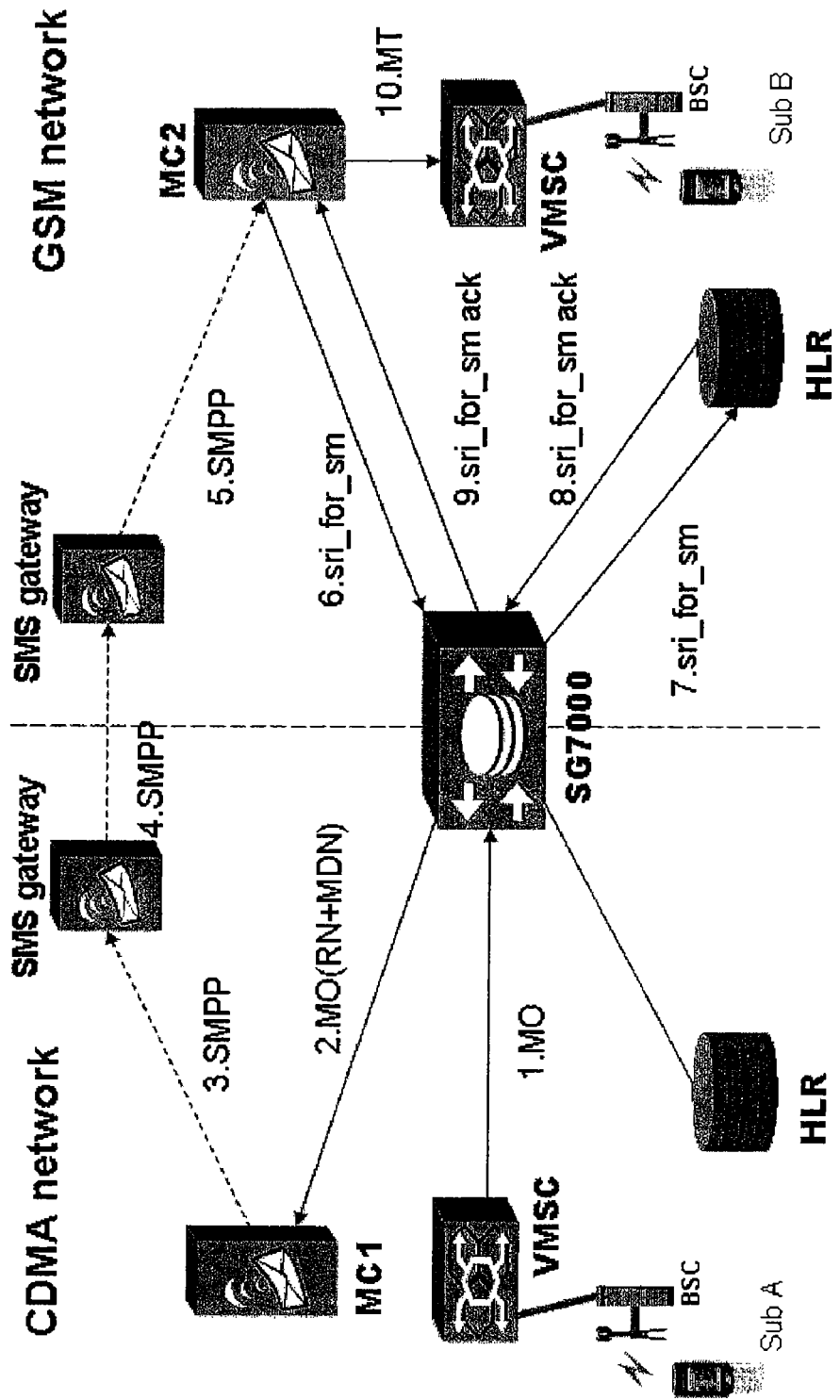
FIG. 7 is a simplified diagram of an inter-network communication method for non-calling type communication using a mobile originated short message (MO) from a CDMA network to a GSM network according to an embodiment of the present invention.

FIG. 7 is a simplified diagram of an inter-network communication method for non-calling type communication using a mobile originated short message (MO) from a CDMA network to a GSM network according to an embodiment of the present invention. This diagram is merely an example, which should not unduly limit the scope of the claims herein. One of ordinary skill in the art would recognize other variations, modifications, and alternatives. As shown, the method includes a process of non-calling type communication with an STP intercepting MO (mobile originated) message between CDMA and GSM networks using a short message process as an example. In a specific embodiment, the method includes a process of a CDMA user sends a short message from CDMA network NP to a user in GSM network. With reference to FIG. 7, the method includes the following processes:

1 A CDMA user A sends a short message from a CDMA network NP to a user B of a GSM network. VMSC sends a MO (mobile originated) message to the calling user home short message center;

2. After STP intercepts MO (mobile originated) message, based on the user number query NPDB, if the called is a user from CDMA network NP to GSM network, the STP will add RN in front of the number of the called (GSM network routing code), then forward it to the calling home short message center MC1;

3. After receiving MO, MC1 sends the short message to the short message gateway of the current network based on the RN code;

4. CDMA network short message gateway sends it to the short message gateway of GSM network through SMPP protocol;

5. The short message gateway of GSM network sends the short message to the called home short message gateway MC2; and 6. After getting the routing information from HLR, MC2 issues the short message to VMSC where the called is located through MT.

Figure 8:
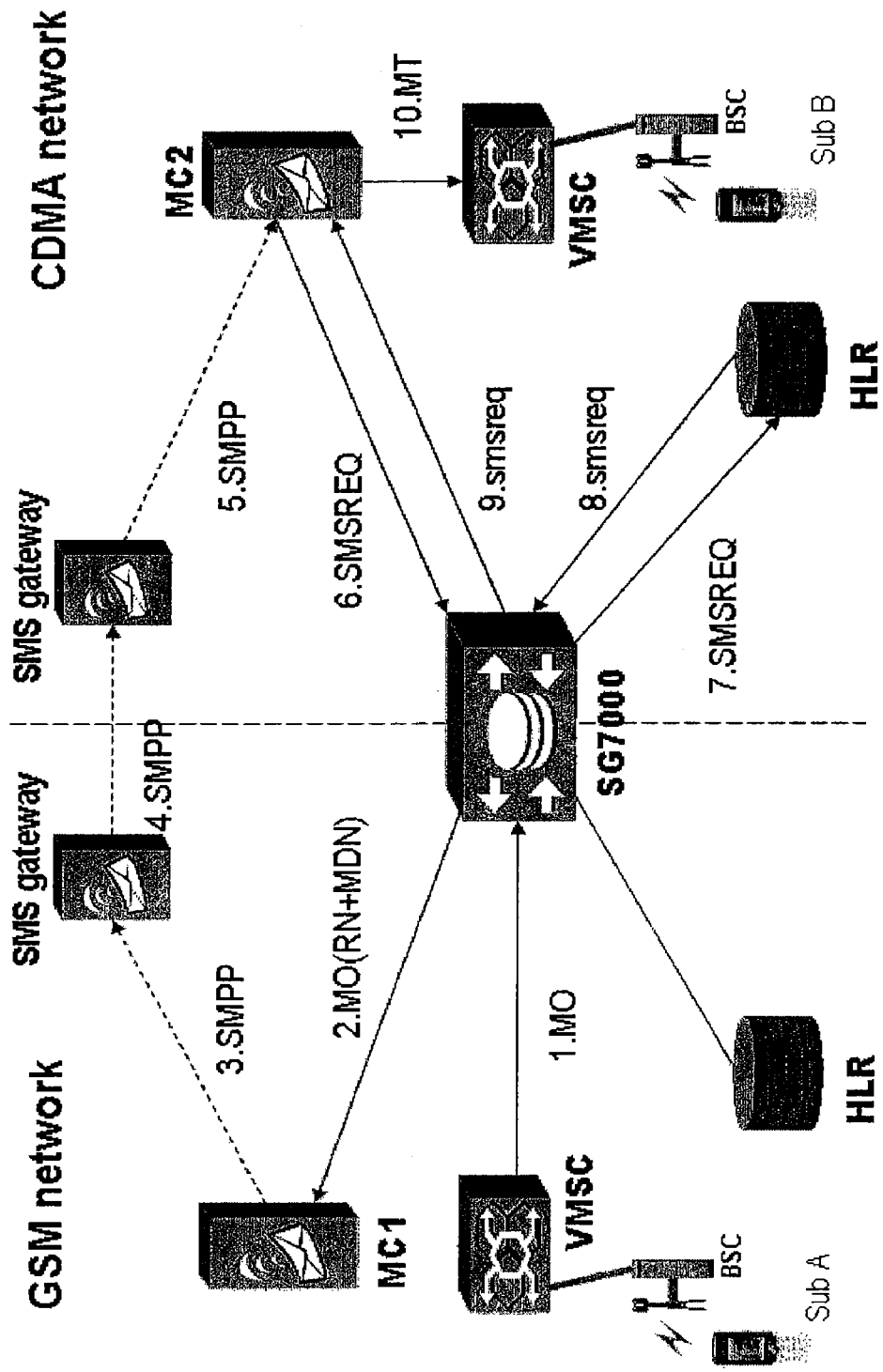
FIG. 8 is a simplified diagram of an inter-network communication method for non-calling type communication using a mobile originated short message (MO) from a GSM network to a CDMA network according to an embodiment of the present invention.

FIG. 8 is a simplified diagram of an inter-network communication method for non-calling type communication using a mobile originated short message (MO) from a GSM network to a CDMA network according to an embodiment of the present invention. This diagram is merely an example, which should not unduly limit the scope of the claims herein. One of ordinary skill in the art would recognize other variations, modifications, and alternatives. As shown, the method includes a process of non-calling type communication with an STP intercepting MO (mobile originated) message between CDMA and GSM networks using a short message process as an example. In a specific embodiment, the method includes a process of a GSM user sending a short message from GSM network NP to a user of CDMA network. With reference to FIG. 8, the method includes the following processes:

1. A GSM user A sends a short message from GSM network NP to a user B of CDMA network. VMSC sends MO (mobile originated) message to the calling user home short message center;

2. After STP intercepts MO (mobile originated) message, based on the user number query NPDB, if the called is a user from GSM network NP to CDMA network, then STP will add RN in front of the number of the called (CDMA network routing code), then forward it to the calling home short message center MC1;

3. After receiving MO, MC1 sends the short message to the short message gateway of the current network based on the RN code;

4. The short message gateway of GSM network sends the short message to the short message gateway of the CDMA network;

5. The short message gateway of CDMA network sends the short message to the called home short message gateway MC2; and 6. After getting the routing information from HLR, MC2 issues the short message to VMCS where the called is located.

Figure 9:
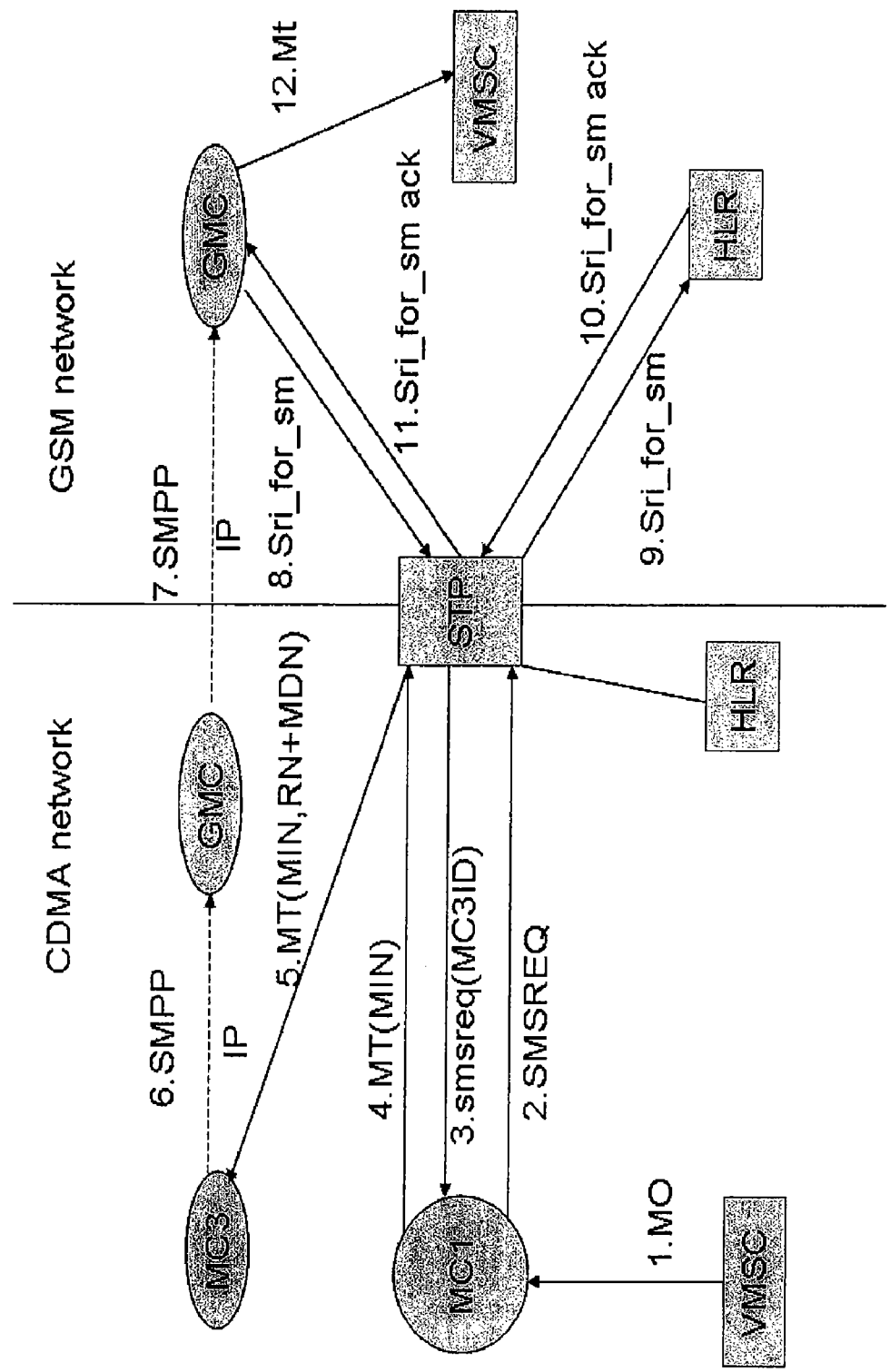
FIG. 9 is a simplified diagram of an inter-network communication method for non-calling type communication using a mobile terminated short message (MT) from a CDMA network to a GSM network according to an embodiment of the present invention.

FIG. 9 is a simplified diagram of an inter-network communication method for non-calling type communication using a mobile terminated short message (MT) from a CDMA network to a GSM network according to an embodiment of the present invention. This diagram is merely an example, which should not unduly limit the scope of the claims herein. One of ordinary skill in the art would recognize other variations, modifications, and alternatives. As shown, the method includes a process of non-calling type communication with an STP intercepting MT (mobile terminated) message between CDMA and GSM networks using a short message process as an example. In a specific embodiment, the method includes a process of a CDMA user sends a short message from CDMA network NP to a user in GSM network. With reference to FIG. 9, the method includes the following processes:

1. A C network originator sends a short message to a user from C network NP to G network, the originating VMSC sends a MO (mobile originated) message to the calling user home MC1, and the called number is the MOBILE DIRECTORY NUMBER (MDN) of the NP user;

2. MC1 initiates the routing operation in HLR, and MC1 sends a SMSREQ message to HLR via STP;

3. After STP intercepts this message and confirms the called is a user from the current network NP to G network, the STP simulates HLR and returns a response, where MSCSIN is the GT address of MC3.

4. After receiving the smsreq message returned by STP, MC1 sends an MT (mobile terminated) message to MC3 via STP;

5. After STP intercepts the MT (mobile terminated) message, it confirms the called is a user from the current network NP to G network, using RN and MDN information as the called sending to MC3;

6. After MC3 receives the MT (mobile terminated) message, MC3 sends a SMPP message to the corresponding short message gateway based on the RN area code, and decides whether MC3 needs to drop the RN code based on the current network situation;

7. The Internet Short Message Gateway (ISMG) in C network sends a SMPP message to ISMG in G network;

8. ISMG in G network initiates Sri_for_sm operation after receiving the SMPP message from C network;

9. STP intercepts the Sri_for_sm message, confirms the called is a user of C network to the current network, and STP forwards the Sri_for_sm message to the correct HLR;

10. HLR returns Sri_for_sm ack;

11. STP returns Sri_for_sm returned by HLR to the ISMG of G network; and

12. ISMG in G network issues MT (mobile terminated) to the called VMSC.

Figure 10:
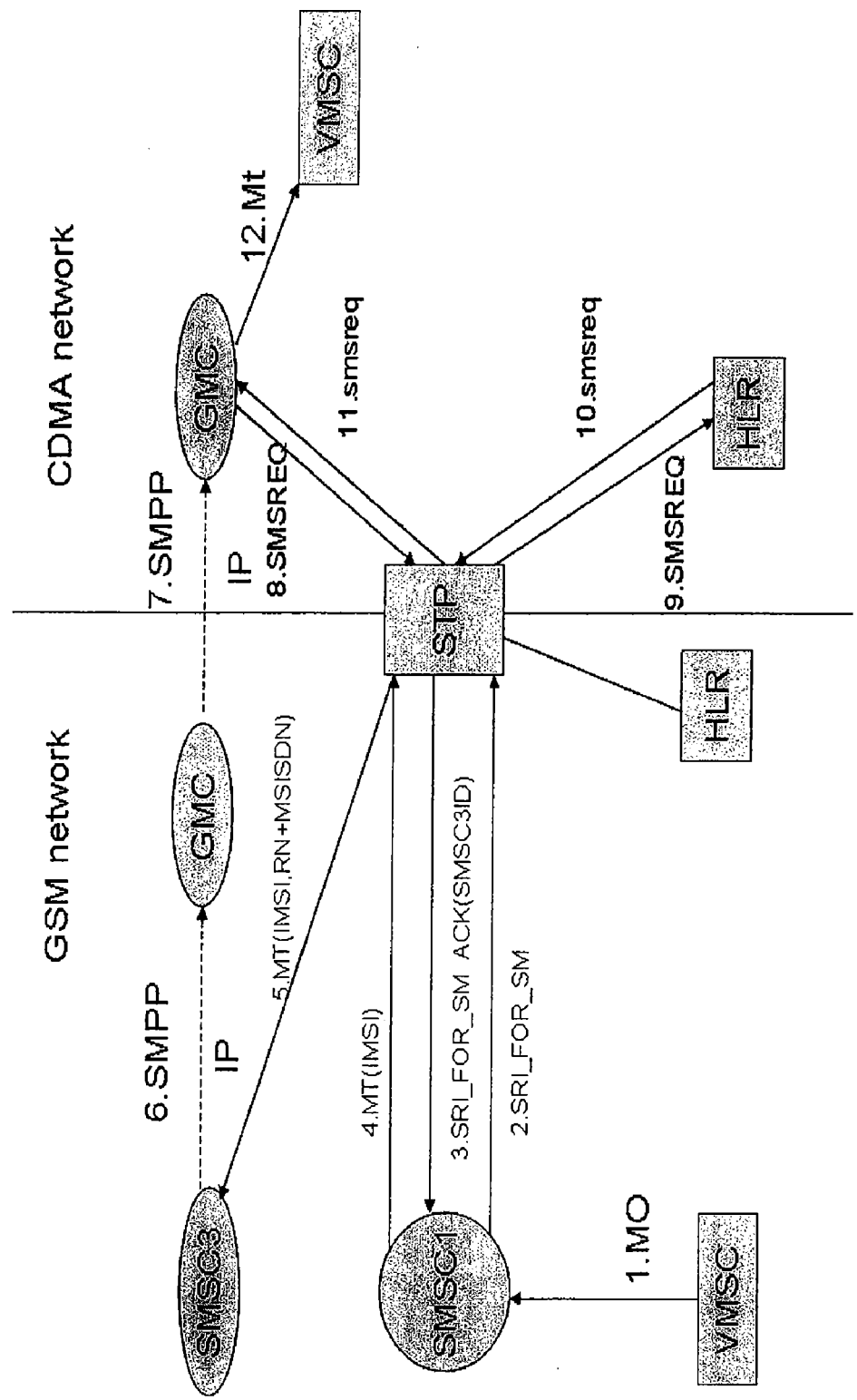
FIG. 10 is a simplified diagram of an inter-network communication method for non-calling type communication using a mobile terminated short message (MT) from a GSM network to a CDMA network according to an embodiment of the present invention.

FIG. 10 is a simplified diagram of an inter-network communication method for non-calling type communication using a mobile terminated short message (MT) from a GSM network to a CDMA network according to an embodiment of the present invention. This diagram is merely an example, which should not unduly limit the scope of the claims herein. One of ordinary skill in the art would recognize other variations, modifications, and alternatives. As shown, the method includes a process of non-calling type communication with an STP intercepting MT (mobile terminated) message between CDMA and GSM networks using a short message process as an example. In a specific embodiment, the method includes a process of a GSM user sending a short message from GSM network NP to a user in CDMA network. With reference to FIG. 10, the method includes the following processes:

1. A G network originator sends a short message to G network NP to a user in C network, the originating VMSC sends an MO (mobile originated) message to the calling user home SMSC1, and the called number is the NP user's MSISDN;

2. SMSC1 initiates HLR for route operation, and SMSC1 sends a Sri_for_sm message to HLR via STP;

3. After STP intercepts this message and confirms the called is a user from G network NP to C network, STP simulates HLR and returns a response, where MSCIN is the GT address of SMSC3;

4. After receiving the smsreq message returned by STP, SMSC3 sends an MT (mobile terminated) message to SMSC3 via STP;

5. After STP intercepts the MT (mobile terminated) message, it confirms that the called is a user from the G network NP to C network, and sends RN AND MSISDN as the called to SMSC3;

6. After SMSC3 receives the MT (mobile terminated) message, SMSC3 sends a SMPP message to the corresponding ISMG based on the RN area code, and it decides whether or not dropping the RN code is needed based on the current network situation;

7. ISMG in G network sends a SMPP message to the ISMG in C network;

8. The ISMG in C network initiates SMSREQ operation after receiving the SMPP message from G network;

9. STP intercepts the SMSREQ message, confirms the called is a user from G network to the current network, then STP forwards the SMSREQ message to the correct HLR;

10. HLR returns response message to smsreq;

11. STP returns smsreq, which was returned by HLR, to ISMG of C network; and

12. The ISMG in C network issues MT (mobile terminated) to VMSC of the called.

The above examples include sequences of processes which provide various methods for inter-network communication between a first user and a second user according to embodiments of the present invention. Other alternatives can also be provided where processes are added, one or more processes are removed, or one or more processes are provided in a different sequence without departing from the scope of the claims herein. Further details of the present method can be found throughout the present specification and more particularly below.

According to a specific embodiment of the present invention, techniques are provided for CDMA and GSM networks to share a database, e.g. a number portability database NPDB, using an STP. For example, a method for user processing from CDMA network MNP to GSM network is described below. In a specific embodiment, the method includes determining NP attribute information about a user. In a specific embodiment, number portability (NP) attribute information includes a user's home network and current network association. For example, in an embodiment, the NP attribute of this user in NPDB is as "the user from C network NP to G network". STP-NPDB determines the calling home network type based on the protocol type. The method includes the following:

A. When a CDMA user is calling this NP user, VMSC will initiate Location request message in HLR to get the routing information; the STP-NPDB, that intercepts this message, then will judge the protocol type of the message. When it detects the message is an IS41 message, this indicates the calling side is a CDMA network. The STP-NPDB then executes the process according to Ported out flow with respect to the called, that is, it simulates HLR and returns RN AND MDN.

B. When a GSM user calls this NP user, VMSC will initiate a SendRoutingInfo (SRI) message to HLR to get the routing message. The STP-NPDB that intercepts this message will then judge the protocol type of the message. When it discovers the message is an MAP message, this indicates the calling side is a GSM network. The STP-NPDB then executes the process according to Ported in flow with regards to the called, and transfers the SRI message to the correct HLR according to data allocation.

In another example, a method for user processing from GSM networks to CDMA networks is described below. The NP attribute for this user in NPDB is "the user from NP of G network to C network". The STP-NPDB then determines the calling home network type according to the protocol type. The method includes the following:

A. When the CDMA user calls this NP user, VMSC will initiate a Location request message in HLR to get the routing information. The STP-NPDB that intercepts this message then will determine the protocol type of the message. When it discovers the message is an IS41 message, this indicates the calling side is a CDMA network. The STP-NPDB then executes the process according to Ported in flow with regards to the called, and transfers Location request message to the correct HLR based on the data allocation.

B. When a GSM user called this NP user, VMSC will initiate a SendRoutingInfo message to HLR to get the routing message. The STP-NPDB that intercepts this message will then judge the protocol type of the message. When it discovers the message is an MAP message, this indicates the calling side is a GSM network, then the STP-NPDB executes the process according to Ported out process flow with regards to the called, that is, it simulates HLR and returns RN and MSISDN.

The above sequence of processes provides a method for inter-network communication between a first user and a second user according to an embodiment of the present invention. Other alternatives can also be provided where processes are added, one or more processes are removed, or one or more processes are provided in a different sequence without departing from the scope of the claims herein. Further details of the present method can be found throughout the present specification and more particularly below.

A method for inter-network communication between a first user and a second user according to an embodiment of the present invention can be briefly outlined below.

1. Receive a request for location associated with the second user;

2. Determine that the request is sent by the first user from the first network;

3. Determine NP attribute information for the second user;

4. If a home network for the second user is the first network and the second user is currently in a second network, then the method includes the following processes:

a. Determine a network identifier for the second network; and b. Send a location message.

5. If a home network for the second user is a second network and the second user is currently in the first network, then the method includes the following processes:
   a. Select a location directory for the second user;
   b. Receive roaming information for the second user from the location directory; and
   c. Send the roaming information.

The above sequence of processes provides a method for inter-network communication between a first user and a second user according to an embodiment of the present invention. As shown, the method uses a combination of processes including a way of identifying NP attribute information for the second user and providing location information in response to the user information. Other alternatives can also be provided where processes are added, one or more processes are removed, or one or more processes are provided in a different sequence without departing from the scope of the claims herein. Further details of the present method can be found throughout the present specification and more particularly below.

Figure 11:
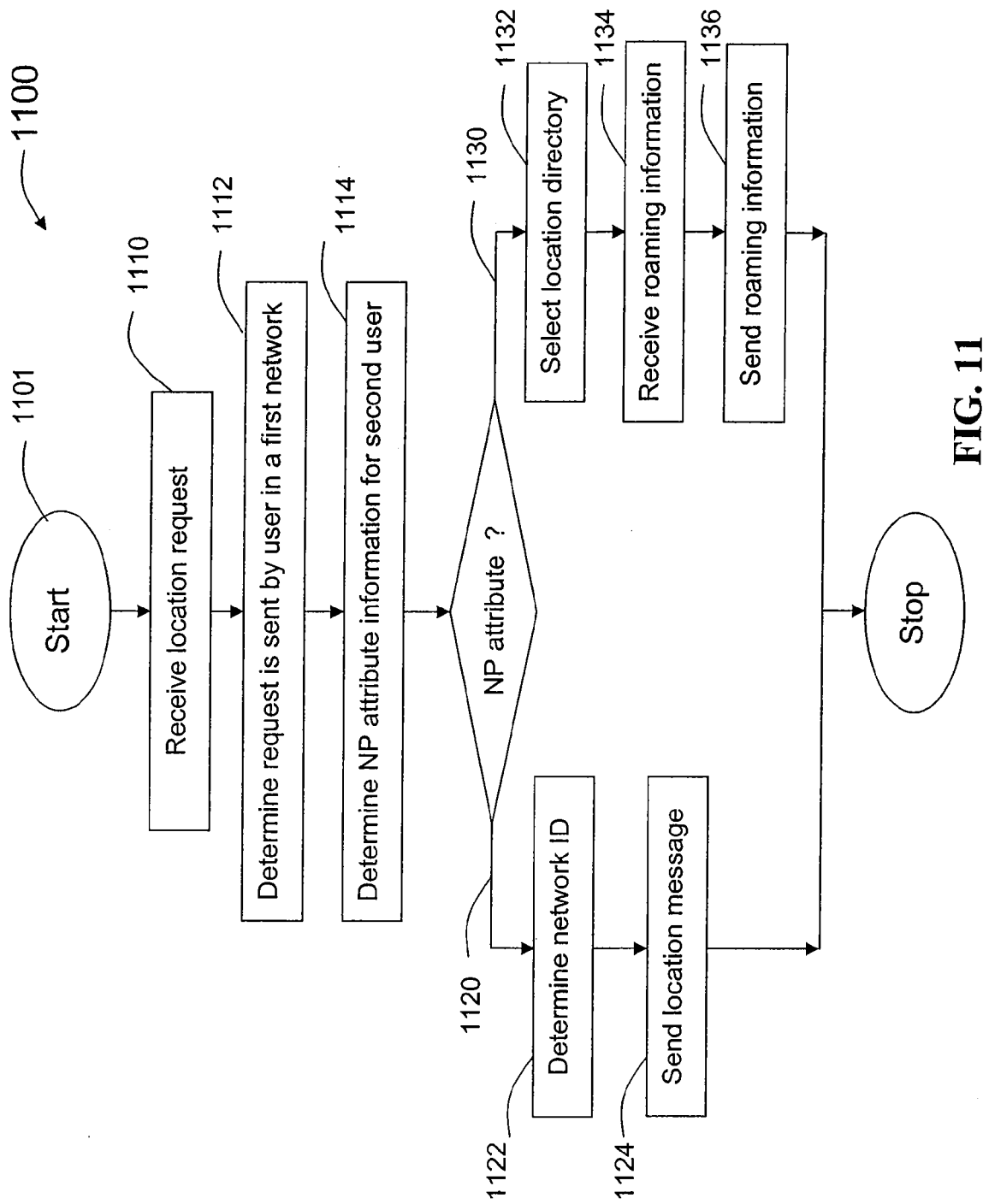
FIG. 11 is a simplified flow diagram of a method for inter-network communication according to an embodiment of the present invention.

FIG. 11 is a simplified flow diagram of a method for inter-network communication between a first user and a second user according to an embodiment of the present invention. This diagram is merely an example, which should not unduly limit the scope of the claims herein. One of ordinary skill in the art would recognize other variations, modifications, and alternatives. For example, the system can be implemented according to one or more of FIGS. 3-10. As shown in FIG. 11, the method is for providing Mobile Number Portability in inter-network communication, which begins at Start, process 1101. The method includes receiving a request for location associated with the second user (process 1110). In an embodiment, the request is sent by a switching system in a first network. For example, the switching system may be a Visitor Mobile Switching Center (VMSC). In a specific embodiment, a mobile phone user may make a call to another mobile phone user. The call may be relayed from a base station controller (BSC) to a VMSC. The VMSC then sends a request for a location associated with the second user. In another embodiment, the request may be for a non-calling type message. For example, a first user may send a short message to a second user. The short message is relayed from a base station controller (BSC) to a VMSC. The VMSC then sends an MO (mobile originated) message to a message center (MC). In an example, the MO (mobile originated) message includes a request for location. In another example, the message center (MC) sends out a request for a location associated with the second user. In yet another short message example, the MC sends an MT (mobile terminated) message which includes a request for location associated with the second user. Of course, there can be other variations, modifications, and alternatives.

In a specific embodiment of the invention, the method includes determining that the request is sent by the first user from the first network, process 1112. In an example, the first network may be a CDMA network. In another example, the first network may be a GSM network. The method also includes, in process 1114, determining an NP attribute for the second user. In an example, a home network for the second user is the first network and the second user has moved to a second network. In another example, a home network for a user is a second network and the user has moved into the first network. In an embodiment, the method includes querying a database, e.g., a database for number portability NPDB, for information regarding the second user. For example, the second network may be a GSM network or a CDMA network. In an embodiment, the method takes different actions in response to information of the second user, e.g. NP attribute information. For example, if a home network for second user is a user is the first network and the second user has moved to a second network, process 1120, then the method includes the following processes:
   a. (process 1122) Determine a network identifier for the second network; and
   b. (process 1124) Send a location message to the first switching system in a protocol of the first network, whereby the first switching system sends an address message to the second network.

As an example, the first network is a CDMA network and the second network is a GSM network. In an embodiment, a Loc_req may be received from a switching system, e.g., a VMSC, in a CDMA network. The method includes sending a location message, e.g., a Loc_req_ack message to the requesting VMSC. In an embodiment, the location message includes routing number (RN) for the second network and mobile directory number (MDN) for the second user. The VMSC then sends an Initial Access Message (IAM) to initiate a call. In another example, the request for location may be for a short message, e.g., an SMSREG sent by a message center (MC). In this example, the method includes sending an SMSACCDEN parameter in an ERROR message. The MC then sends an SMPP message to an SMS gateway system. In another short message example, the request for location may be an MO (mobile originated) message sent by a VMSC. In this example, the method includes sending RN and MDN information in an MO (mobile originated) message. The MC then sends an SMPP message to an SMS gateway system. In yet another short message example, the request for location may be an MT (mobile terminated) message sent by a message center (MC). In this example, the method includes sending an MIN, RN and MDN information in a location message. Of course, there can be other variations, modifications, and alternatives. Further details are discussed in the examples below.

In another embodiment, the first network is a GSM network and the second network is a CDMA network. For example, an SRI may be received from a switching system, e.g., a VMSC, in a GSM network. The method includes sending a location message, e.g., an Sri_ack message to the requesting VMSC. In an embodiment, the location message includes routing number (RN) for the second network and mobile station international ISDN number (MSISDN) for the second user. The VMSC then sends an IAM to a gateway switching system (GMSC). In another example, the request for location may be for a short message, e.g., an sri_for_sm sent by a message center (MC). In this example, the method includes sending an "Unavailablesubscriber" parameter in an ERROR message. The MC then sends an SMPP message to a SMS gateway system. In another short message example, the request for location may be an MO (mobile originated) message sent by a VMSC. In this example, the method includes sending RN and MDN information in an MO (mobile originated) message. The MC then sends an SMPP message to a SMS gateway system. In yet another short message example, the request for location may be an MT (mobile terminated) message sent by a message center (MC). In this example, the method includes sending an IMSI, RN and MSISDN information in a location message. Of course, there can be other variations, modifications, and alternatives. Further details will be discussed in the examples below.

In a specific embodiment, process 1130, if a home network for the second user is a second network and the second user has moved into the first network, the method includes the following processes:

a. (process 1132) Select a location directory for the second user.

b. (process 1134) Receive roaming information for the second user from the location directory; and c. (process 1136) Send the roaming information to the switching system.

Depending on the embodiments, the request for location may be sent by various users. The method includes recognizing information of the requester and selecting a location directory which is capable of determining roaming information for the second user in the first network, process 1132. In certain embodiments, the location directory may be a home location register (HLR). The method includes receiving roaming information for the second user from the location directory (process 1134), and sending the roaming information to the switching system, whereby the switching system initiating a call to the second user (process 1136). In a specific embodiment, the location request is for calling-type communication. For example, the request for location may be sent by a GMSC in a GSM network which is looking for a location associated with a user who has moved from a CDMA network into the GSM network. In this case, the location request includes an SRI message, and the roaming information is included in an SRI_ACK message. In a specific embodiment, after receiving the roaming information, the GMSC sends an IAM to a VMSC which calls a BSC to reach the second user. In another example, the request for location may be sent by a GMSC in a CDMA network which is looking for a location associated with a user who has moved from a GSM network into the CDMA network. In this case, the location request includes a Loc_req message, and the roaming information is included in a Loc_req_ack message. In a specific embodiment, after receiving the roaming information, the GMSC sends an IAM to a VMSC which calls a BSC to reach the second user. Of course, there can be other variations, modifications, and alternatives.

In another specific embodiment, the location request is for non-calling-type communication. Examples of non-calling type communication includes short messages. For example, the location request may be an sri_for_sm message sent by a message center (MC) in a GSM network, and the roaming information may be included in an sri_for_sm_ack message. In an embodiment, after receiving the roaming information, the MC initiates the call by sending an MT (mobile terminated) message to a VMSC which calls the second user through a BSC. Alternatively, the location request may be an SMSREQ message sent by a message center (MC) in a CDMA network, and the roaming information may be included in an smsreq message. In an embodiment, after receiving the roaming information, the MC initiates the call by sending an MT (mobile terminated) message to a VMSC which calls the second user through a BSC. Of course, there can be other variations, modifications, and alternatives.

A method for inter-network communication between a first user and a second user according to an alternative embodiment of the present invention can be briefly outlined below.

1. Receive a request for location associated with the second user;
2. Determine a network identifier for the second network;
3. Send a location message;
4. Receive a request for routing information for the second user;
5. Select a location directory for the second user;
6. Receive roaming information for the second user from the location directory; and
7. Send the roaming information.

The above sequence of processes provides a method for inter-network communication between a first user and a second user according to an embodiment of the present invention. As shown, the method uses a combination of processes including a way of identifying information of the second user, providing location information in response to the user information, and selecting a location directory. Other alternatives can also be provided where processes are added, one or more processes are removed, or one or more processes are provided in a different sequence without departing from the scope of the claims herein. Further details of the present method can be found throughout the present specification and more particularly below.

Figure 12:
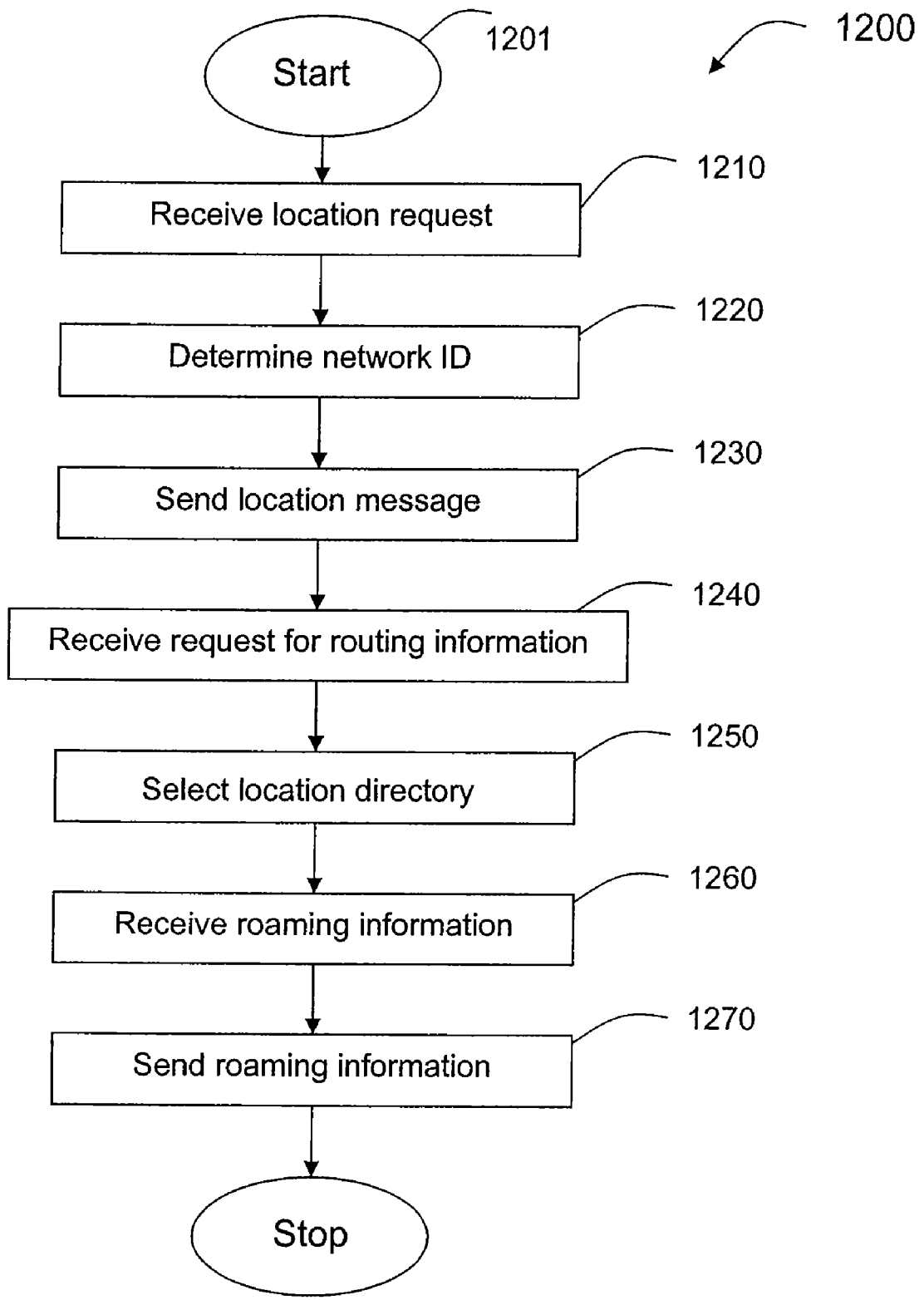
FIG. 12 is a simplified flow diagram of a method for inter-network communication according to an alternative embodiment of the present invention.

FIG. 12 is a simplified flow diagram of a method for inter-network communication according to an alternative embodiment of the present invention. This diagram is merely an example, which should not unduly limit the scope of the claims herein. One of ordinary skill in the art would recognize other variations, modifications, and alternatives. For example, the method can be implemented according to one or more of FIGS. 3-10. As shown in FIG. 12, the method is for inter-network communication which begins at Start, process 1201. The method includes receiving a request for location associated with the second user (process 1210). In an embodiment, the request is sent by a switching system in a first network. For example, the switching system may be a Visitor Mobile Switching Center (VMSC). In a specific embodiment, a mobile phone user may make a call to another mobile phone user. The call may be relayed from a base station controller (BSC) to a VMSC. The VMSC then sends a request for a location associated with the second user. In another embodiment, the request may be for a non-calling type message. For example, a user may send a short message to a second user. The short message is relayed from a base station controller (BSC) to a VMSC. The VMSC then sends an MO (mobile originated) message to a message center (MC). In an example the MO (mobile originated) message includes a request for location. In another example, the message center (MC) sends out a request for a location associated with the second user. In yet another short message example, the MC sends MT (mobile terminated) message which includes a request for location associated with the second user. Of course, there can be other variations, modifications, and alternatives.

In a specific embodiment of the invention, the method includes determining that the request is sent by the first user from the first network. In an example, the first network may be a CDMA network. In another example, the first network may be a GSM network. The method also includes determining if a home network for the second user is the first network and the second user has moved to a second network. In an embodiment, the method includes querying a database, e.g., a database for number portability NPDB, for information regarding the second user. For example, the second network may be a GSM network or a CDMA network. In a specific embodiment, determining a network identifier for the second network (process 1220) and sending a location message to the first switching system (process 1230). The first switching system then sends an address message to the second network.

In a specific embodiment, the first network is a CDMA network and the second network is a GSM net work. For example, a Loc_req may be received from a switching system, e.g., a VMSC, in a CDMA network. The method includes sending a location message, e.g., a Loc_req ack message to the requesting VMSC. In an embodiment, the location message includes routing number (RN) for the second network and mobile directory number (MDN) for the second user. The VMSC then sends an Initial Access Message (IAM) to initiate a call. In another example, the request for location may be for a short message, e.g., an SMSREG sent by a message center (MC). In this example, the method includes sending an SMSACCDEN parameter in an ERROR message. The MC then sends an SMPP message to a SMS gateway system. In another short message example, the request for location may be an MO (mobile originated) message sent by a VMSC. In this example, the method includes sending an RN and MDN information in an MO (mobile originated) message. The MC then sends an SMPP message to a SMS gateway system. In yet another short message example, the request for location may be an MT (mobile terminated) message sent by a message center (MC). In this example, the method includes sending an MIN, RN and MDN information in a location message. Of course, there can be other variations, modifications, and alternatives. Further details are discussed in the examples below.

In another embodiment, the first network is a GSM network and the second network is a CDMA network. For example, an SRI may be received from a switching system, e.g., a VMSC, in a GSM network. The method includes sending a location message, e.g., an Sri_ack message to the requesting VMSC. In an embodiment, the location message includes routing number (RN) for the second network and mobile station international ISDN number (MSISDN) for the second user. The VMSC then sends an IAM to a gateway switching system (GMSC). In another example, the request for location may be for a short message, e.g., an sri_for_sm sent by a message center (MC). In this example, the method includes sending an "Unavailablesubscriber" parameter in an ERROR message. The MC then sends an SMPP message to an SMS gateway system. In another short message example, the request for location may be an MO (mobile originated) message sent by a VMSC. In this example, the method includes sending RN and MDN information in an MO (mobile originated) message. The MC then sends an SMPP message to an SMS gateway system. In yet another short message example, the request for location may be an MT (mobile terminated) message sent by a message center (MC). In this example, the method includes sending an IMSI, RN and MSISDN information in a location message. Of course, there can be other variations, modifications, and alternatives. Further details will be discussed in the examples below.

In a specific embodiment, the method includes (process 1240) receiving a request from a second switching system for routing information for the second user in the second network. For example, the second switching system may be a gateway switching center (GMSC) which has received an Initial Access Message (IAM) from the first network. Depending on the embodiments, the request for routing information can be an SRI from a GMSC in a GSM network or a Loc_req from a GMSC in a CDMA network. In other embodiments related to short messages, the request for routing information can be an sri_for_sm from an MC in a GSM network or an SMSREQ from an MC in a CDMA network. Of course, there can be other variations, modifications, and alternatives.

Depending on the embodiments, the request for routing information may be sent by various users. The method includes recognizing information of the requester and selecting a location directory which is capable of determining roaming information for the second user in the first network, process 1250. In certain embodiments, the location directory may be a home location register (HLR). The method includes receiving roaming information for the second user from the location directory, process 1260, and sending the roaming information to the switching system, whereby the switching system initiating a call to the second user, process 1270. In a specific embodiment, the location request is for calling-type communication. For example, the request for location may be sent by a GMSC in a GSM network which is looking for a location associated with a user who has moved from a CDMA network into the GSM network. In this case, the location request includes an SRI message, and the roaming information is included in an SRI_ACK message. In a specific embodiment, after receiving the roaming information, the GMSC sends an IAM to a VMSC which calls a BSC to reach the second user. In another example, the request for location may be sent by a GMSC in a CDMA network which is looking for a location associated with a user who has moved from a GSM network into the CDMA network. In this case, the location request includes a Loc_req message, and the roaming information is included in a Loc_req_ack message. In a specific embodiment, after receiving the roaming information, the GMSC sends an IAM to a VMSC which calls a BSC to reach the second user. Of course, there can be other variations, modifications, and alternatives.

In another specific embodiment, the location request is for non-calling-type communication. Examples of non-calling type communication includes short messages. For example, the location request may be an sri_for_sm message sent by a message center (MC) in a GSM network, and the roaming information may be included in an sri_for_sm_ack message. In an embodiment, after receiving the roaming information, the MC initiates the call by sending an MT (mobile terminated) message to a VMSC which calls the second user through a BSC. Alternatively, the location request may be a SMSREQ message sent by a message center (MC) in a CDMA network, and the roaming information may be included in an smsreq message. In an embodiment, after receiving the roaming information, the MC initiates the call by sending an MT (mobile terminated) message to a VMSC which calls the second user through a BSC. Of course, there can be other variations, modifications, and alternatives.

Merely as examples, the method discussed above with respect to the simplified flow diagram in FIG. 12 can be implemented in various embodiments, such as illustrated in FIGS. 3-10. In some embodiments, the first network is a CDMA network. In another embodiments, the first network is a GSM network. In certain embodiments, the communication includes voice communication. In other embodiments, the communication is short message communication. In some embodiments, the communication can include video, data, or multimedia communication. In specific embodiments, the method queries a database for the first network when processing information associated with the first request. In other embodiments, the method queries a common database for the first and the second networks. Of course there can be many variations, modifications, and alternatives.

For example, the first network may be a CDMA network. Referring to FIG. 3, in a specific embodiment, the first network is a CDMA network and the first request for location is a Loc_req in CDMA for voice communication. The location message includes a routing number (RN) and a mobile directory number (MDN), and the location message is included in a Loc_req_ack message. In an embodiment, the second network is a GSM network, and the third request for routing number is an SRI message. In this example, the roaming information is included in an SRI_ACK message.

Referring to FIG. 5, in a specific embodiment, the first network is a CDMA network, and the first request for location is an SMSREQ for short message communication. The location message includes an SMSACCDEN parameter, and the location message is included in an ERROR message. In a specific example, the SMSACCDEN parameter is selected from a range of 224-255. In an embodiment, the second network is a GSM network, and the third request for routing number is an sri_for_sm message. In this example, the roaming information is included in an sri_for_sm_ack message.

Referring to FIG. 7, in a specific embodiment, the first network is a CDMA network and the first request for location is an MO (mobile originated) message for short message communication, wherein the location message includes an RN parameter and an MDN parameter and the location message is included in a second MO (mobile originated) message. In an embodiment, the second network is a GSM network and the third request for routing number is an sri_for_sm message. In this example, the roaming information is included in an sri_for_sm_ack message.

Referring to FIG. 9, in a specific embodiment, the first network is a CDMA network and the first request for location is an MT (mobile terminated) message for short message communication. The location message includes an MIN parameter, an RN parameter, and an MDN parameter. The location message is included in a second MT (mobile terminated) message. In an embodiment, the second network is a GSM network and the third request for routing number is an sri_for_sm message. In this example, the roaming information is included in an sri_for_sm message.

In other examples, the first network may be a GSM networks. Referring to FIG. 4, in a specific embodiment, the first network is a GSM network and the first request for location is an SRI for voice communication. The location message includes a routing number (RN) and a mobile directory number (MSISDN) and the location message is included in an Sri_ack message. In a specific embodiment, the mobile directory number is a mobile station international ISDN number (MSISDN). In an embodiment, the second network is a CDMA network, wherein the third request for routing number is a Loc-req message. In this example, the roaming information is included in a Loc_req_ack message.

Referring to FIG. 6, in a specific embodiment, the first network is a GSM network and the first request for location is an sri_for_sm for short message communication. The location message includes an error code, and the location message is included in an ERROR message. In a specific example, the error code is Unavailablesubscriber. In an embodiment, the second network is a CDMA network, and the third request for routing number is an SMSREQ message. In this example, the roaming information is included in an smsreq message.

Referring to FIG. 8, in a specific embodiment, the first network is a GSM network and the first request for location is an MO (mobile originated) message for short message communication. The location message includes RN and MDN, and the location message is included in a second MO (mobile originated) message. In an embodiment, the second network is a CDMA network. The third request for routing number is an SMSREQ message. In this example, the roaming information is included in an smsreq message.

Referring to FIG. 10, in a specific embodiment, the first network is a GSM network and the first request for location is an MT (mobile terminated) message for short message communication. The location message includes an IMSI parameter, an RN parameter, and an MSISDN parameter. The location message is included in an MT (mobile terminated) message. In an embodiment, the second network is a CDMA network, and the third request for routing number is an SMSREQ message. In this example, the roaming information is included in an smsreq message. Of course there can be many variations, modifications, and alternatives.

In another embodiment of the invention, a system is provides for inter-network communication between a first user and a second user. In an embodiment, the system includes one or more components which are configured to receive a first request for a location associated with the second user. In a specific embodiment, the first request is sent by a first switching system in a first network in response to a second request, which is made by the first user to establish a communication with the second user. The system includes one or more components to process information associated with the first request and determines a network identifier for a second network related to the location associated with the second user based on at least information associated with the first request. The system also includes one or more components to send a location message to the first switching system. In an example, the location message includes the network identifier for the second network. In an embodiment, the system includes one or more components which are configured to receive a third request for routing information associated with the second user in the second network. For example, the third request is sent from a second switching system for the second network. The system includes one or more components to determine a location directory in the second network for the second user. In an embodiment, the location directory is capable of determining roaming information for the second user in the second network. The system also includes one or more components configured to receive the roaming information for the second user from the location directory, and send the roaming information to the second switching system. In a specific embodiment, the second switching system is capable of establishing the communication with the second user. Of course, there can be other variations, modifications, and alternatives.

Although the above has been shown using a selected group of components for the a system for inter-network communication between a first user and a second user, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification. For example, the system can be implemented according to one or more of FIGS. 3-10. Of course, there can be other variations, alternatives, and modifications.

In an alternative embodiment, the invention provides a computer program product which includes a computer readable medium. The computer readable medium includes instructions for inter-network communication between a first user and a second user. In a specific embodiment, the computer readable medium includes the following:

1. One or more instructions for receiving a first request for a location associated with the second user. In an embodiment, the first request is sent by a first switching system in a first network in response to a second request, whereas the second request is made by the first user to establish a communication with the second user;

2. One or more instructions for processing information associated with the first request. In an embodiment, the process may include look up a database;

3. One or more instructions for determining a network identifier for a second network related to the location associated with the second user based on at least information associated with the first request;

4. One or more instructions for sending a location message to the first switching system. In a specific embodiment, the location message includes the network identifier for the second network;

5. One or more instructions for receiving a third request for routing information associated with the second user in the second network. The third request is sent from a second switching system for the second network;

6. One or more instructions for determining a location directory in the second network for the second user. In an embodiment, the location directory is capable of determining roaming information for the second user in the second network;

7. One or more instructions for receiving the roaming information for the second user from the location directory; and 8. One or more instructions for sending the roaming information to the second switching system. In an embodiment, the second switching system is capable of establishing the communication with the second user.

Although the above has been illustrated in terms of specific computer software instruction features, it would be recognized that many variations, alternatives, and modifications can exist. For example, any of the software features can be further combined, or even separated. The software can be further integrated or less integrated depending upon the application. Further details of certain methods according to the present invention can be found throughout the present specification. For example, the computer program product can be implemented according to one or more of FIGS. 3-12. Of course, there can be other variations, alternatives, and modifications.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for inter-network communication between a first user and a second user, the method comprising:
    receiving, by a signaling transfer point (STP) system, a first request for a location associated with the second user, the first request being sent by a first switching system for a first network in response to a second request, the second request being made by the first user to establish a communication with the second user, wherein the first network comprises a first network type;
    processing, by the STP system, information associated with the first request by querying a common database for the first network and the second network;
    determining, by the STP system, a network identifier for a second network related to the location associated with the second user based on at least information associated with the first request, wherein the second network comprises a second network type different from the first network type, and wherein the first network and the second network co-exist in a single provider and as such said common database is maintained for both the first network and the second network;
    sending, by the STP system, a location message to the first switching system, the location message including the network identifier for the second network;
    receiving, by the STP system, a third request for routing information associated with the second user in the second network, the third request being sent from a second switching system for the second network;
    based on second user information contained in said third request, determining, by the STP system, a location directory in the second network for the second user, the location directory being capable of determining roaming information for the second user in the second network;
    receiving, by the STP system, the roaming information for the second user from the location directory as a response to said third request; and
    sending, by the STP system, the roaming information to the second switching system, the second switching system being capable of establishing the communication with the second user, such that the first user and the second user are capable of having number portability between the first network of the first type and the second network of the second type.

2. The method of claim 1 wherein the database is an STP-NPDB for the first network.

3. The method of claim 1 wherein the database is a shared STP-NPDB for the first network and the second network.

4. The method of claim 1 wherein the first network is a CDMA network.

5. The method of claim 1 wherein the first network is a GSM network.

6. The method of claim 1 wherein the communication includes calling-type communication.

7. The method of claim 6 wherein the calling-type communication includes voice communication.

8. The method of claim 1 wherein the communication includes non-calling type communication.

9. The method of claim 8 wherein the non-calling type communication includes short message communication.

10. The method of claim 1 wherein the first network is a CDMA network and the first request for location is a $Loc_{13}$ req for voice communication, wherein the location message includes a routing number (RN) and a mobile directory number (MDN) and the location message is included in a Loc req_ack message.

11. The method of claim 10 wherein the second network is a GSM network and the third request for the routing number is an SRI message, wherein the roaming information is included in an $SRI_{13}$ ACK message.

12. The method of claim 1 wherein the first network is a CDMA network and the first request for location is a SMSREQ for short message communication, wherein the location message includes a SMSACCDEN parameter and the location message is included in an ERROR message.

13. The method of claim 12 wherein the SMSACCDEN parameter is selected from a range of 224-255.

14. The method of claim 12 wherein the second network is a GSM network and the third request for the routing number is a sri_for_sm message, wherein the roaming information is included in a sri_for_sm_ack message.

15. The method of claim 1 wherein the first network is a CDMA network and the first request for location is a mobile originated (MO) message for short message communication, wherein the location message includes a RN parameter and a MDN parameter and the location message is included in a second MO message.

16. The method of claim 15 wherein the second network is a GSM network and the third request for the routing number is a sri_for_sm message, wherein the roaming information is included in a sri_for_sm_ack message.

17. The method of claim 1 wherein the first network is a CDMA network and the first request for location is a mobile terminated (MT) message for short message communication, wherein the location message includes a MIN parameter, a RN parameter, and a MDN parameter and the location message is included in a second MT message.

18. The method of claim 17 wherein the second network is a GSM network and the third request for the routing number is a sri_for_sm message, wherein the roaming information is included in a sri_for_sm_ack message.

19. The method of claim 1 wherein the first network is a GSM network and the first request for location is an SRI message for voice communication, wherein the location message includes a routing number (RN) and a mobile directory number (MSISDN) and the location message is included in a Sri_ack message.

20. The method of claim 19 wherein the second network is a CDMA network, wherein the third request for the routing number is a Loc_req message, wherein the roaming information is included in a Loc_req_ack message.

21. The method of claim 1 wherein the first network is a GSM network and the first request for location is a sri_for_sm message for short message communication, wherein the location message includes an error code and the location message is included in an ERROR message.

22. The method of claim 21 wherein the error code is Unavailablesubscriber.

23. The method of claim 21 wherein the second network is a CDMA network, wherein the third request for the routing number is a SMSREQ message, wherein the roaming information is included in a smsreq message.

24. The method of claim 1 wherein the first network is a GSM network and the first request for location is an MO message for short message communication, wherein the location message includes RN and MDN information and the location message is included in a second MO message.

25. The method of claim 24 wherein the second network is a CDMA network, wherein the third request for the routing number is a SMSREQ message, wherein the roaming information is included in a smsreq message.

26. The method of claim 1 wherein the first network is a GSM network and the first request for location is a MT (mobile terminated) message for short message communication, wherein the location message includes an IMSI parameter, a RN parameter, and a MSISDN parameter, and the location message is included in a second MT message.

27. The method of claim 26 wherein the second network is a CDMA network, wherein the third request for the routing number is an SMSREQ message, wherein the roaming information is included in an smsreq message.

28. A non-transitory computer readable medium for inter-network communication between a first user and a second user having sets of instructions stored thereon which, when executed by one or more computers in a signaling transfer point (STP) system, cause the STP system to:
receive a first request for a location associated with the second user, the first request being sent by a first switching system in a first network in response to a second request, the second request being made by the first user to establish a communication with the second user, wherein the first network comprises a first network type;
process information associated with the first request by querying a common database for the first network and the second network;
determine a network identifier for a second network related to the location associated with the second user based on at least information associated with the first request, wherein the second network comprises a second network type different from the first network type, and wherein the first network and the second network co-exist in a single provider and as such said common database is maintained for both the first network and the second network;
send a location message to the first switching system, the location message including the network identifier for the second network;
receive a third request for routing information associated with the second user in the second network, the third request being sent from a second switching system for the second network;
based on second user information contained in said third request, determine a location directory in the second network for the second user, the location directory being capable of determining roaming information for the second user in the second network;
receive the roaming information for the second user from the location directory, as a response to said third request; and
send the roaming information to the second switching system, the second switching system being capable of establishing the communication with the second user, such that the first user and the second user are capable of having number portability between the first network of the first type and the second network of the second type.

* * * * *